US008208628B2

(12) United States Patent
Yener et al.

(10) Patent No.: US 8,208,628 B2
(45) Date of Patent: Jun. 26, 2012

(54) SYSTEMS AND METHODS FOR KEY GENERATION IN WIRELESS COMMUNICATION SYSTEMS

(75) Inventors: Bulent Yener, Canaan, NY (US); Alejandra Mercado, Potomac, MD (US); Babak Azimi-Sadjadi, Potomac, MD (US); Aggelos Kiayias, Willimantic, CT (US)

(73) Assignee: University of Connecticut, Center for Science and Technology Commercialization, Farmington, CT (US)

( * ) Notice: Subject to any disclaimer, the term of this patent is extended or adjusted under 35 U.S.C. 154(b) by 924 days.

(21) Appl. No.: 12/288,023

(22) Filed: Oct. 15, 2008

(65) Prior Publication Data
US 2009/0225982 A1    Sep. 10, 2009

Related U.S. Application Data

(60) Provisional application No. 60/979,925, filed on Oct. 15, 2007.

(51) Int. Cl.
*H04L 29/06* (2006.01)
(52) U.S. Cl. .......................................... 380/44; 380/259
(58) Field of Classification Search .................... 380/44
See application file for complete search history.

(56) References Cited

U.S. PATENT DOCUMENTS
2007/0177729 A1 * 8/2007 Reznik et al. .................. 380/44

OTHER PUBLICATIONS

International Search Report and Written Opinion in International Patent Application No. WO2009/051733.
Tope, Michael A., McEachen, John C., "Unconditionally Secure Communications Over Fading Channels", IEEE, 2001, pp. 54-58.
Aono, Tomoyuki, Higuchi, Keisuke, Ohira, Takashi, Komiyama, Bokuji, Sasaoka, Hideichi, "Wireless Secret Key Generation Exploiting Reactance-Domain Scalar Response of Mulitpath Fading Channels", IEEE Transactions on Antennas and Propagation, Nov. 2005, vol. 53, pp. 3776-3784.
Ohira, Takashi, "Secret Key Generation Exploiting Antenna Beam Steering and Wave Propagation Reciprocity", ATR Wave Engineering Laboratories, Kyoto 619-0288, Japan, 81-774-95-2710.

* cited by examiner

*Primary Examiner* — Kambiz Zand
*Assistant Examiner* — Imhotep Durham
(74) *Attorney, Agent, or Firm* — Ohlandt, Greeley, Ruggiero & Perle, L.L.P.

(57) ABSTRACT

A system and a method for providing a secure wireless ad-hoc network in a wireless communication system having at least two transceivers coupled by a wireless transmission link are disclosed. The method includes receiving a data transmission at a first transceiver from a second transceiver, wherein the data transmission identifies a source of a signal in the data transmission and the signal is identified by a signal envelope; detecting a deep fade in the data transmission, wherein the first and second transceivers are configured to sample the source of the signal in the data transmission; determining whether the received signal exceeds a predetermined threshold for deep fades, wherein the predetermined threshold is preset by the first and second transceivers; generating a bit-string corresponding to each of the transceivers based on channel fading information relating to the wireless transmission link; and, using the bit-string, generating a key.

35 Claims, 7 Drawing Sheets

FIG. 1a.
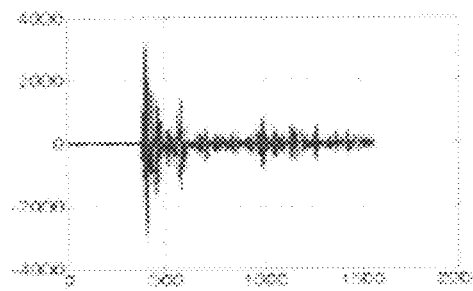
FIG. 1b.
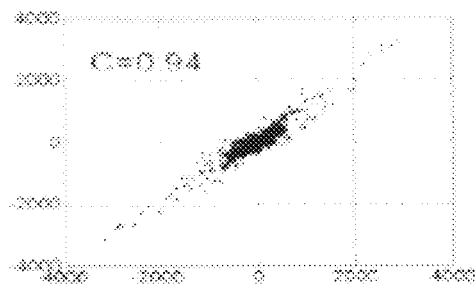
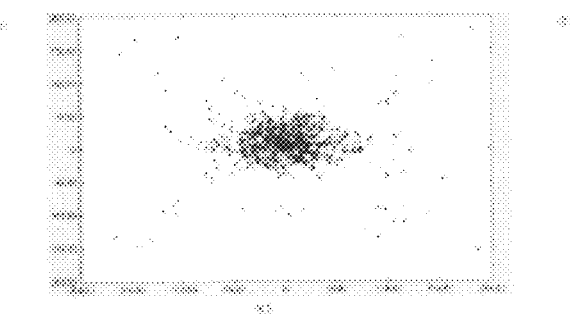
FIG. 1c.

SYSTEMS AND METHODS FOR KEY GENERATION IN WIRELESS COMMUNICATION SYSTEMS

CROSS-REFERENCE TO RELATED APPLICATIONS

The present application claims priority to U.S. Provisional Patent Application No. 60/979,925, to Yener et al., filed Oct. 15, 2007, and entitled "Improved Security from Channel Reciprocity and Robust Key Generation from Signal Envelopes in Wireless Networks," and incorporates its disclosure herein by reference in its entirety.

BACKGROUND OF THE INVENTION

1. Field of the Invention

The present invention generally relates to wireless communication systems. More particularly, the present invention relates to providing secure communications in ad-hoc wireless communication systems. Even more particularly, the present invention relates to generating keys in wireless communication systems.

2. Background

The broadcast nature of a wireless link provides a natural eavesdropping and intervention capability to an adversary. Thus, securing a wireless link is essential to the security of a wireless network, and key generation algorithms are used for securing wireless links. However, traditional key agreement algorithms can be very costly and/or unsuitable in many settings, e.g., in wireless ad-hoc networks, since they consume scarce resources such as bandwidth and battery power.

Currently, there does not exist a one-size-fits-all key management scheme for all wireless networks. Conventional solutions depend on the network architecture, existence of trusted third parties, available resources on wireless clients and the capabilities of adversaries. In conventional ad-hoc wireless networks having a plurality of communication nodes, the general approach is to equip each node with either (i) a master key, or (ii) a list of keys (a key-chain), or (iii) keying materials. This way a pair of wireless nodes can either find or generate a key in common. Further, conventional systems include master key based solutions, where wireless nodes are pre-distributed with a master key. In this case, two nodes first exchange random "nonces" or node IDs and use the master key along with a pseudo random function to generate a symmetric session key. In the conventional key-chain based solutions, each wireless node is pre-distributed with a list of keys, called a key-chain. In these systems, two nodes exchange their list of key IDs and use a combination of common keys as the symmetric session key. In such systems, key-chains must be carefully designed so that either two nodes have a key in common in their key-chains and they have a wireless link between them, or there is a path, called a key-path, among these two nodes where each pair of neighboring nodes on this path have a key in common.

Algorithms for generating key-chains fall into the following classes:

(i) probabilistic class, where key-chains are randomly selected among a pool of keys;
(ii) deterministic class, where key chains are designed from a set of keys by using algorithms such as Balanced Incomplete Block Design ("BIBD") of design theory (e.g., Camtepe, S. A., et al., "Combinatorial Design of Key Distribution Mechanisms for Wireless Sensor Networks", in Samarati et al. (eds.), Computer Security-ESORCIS, Springer-Verlag, LNCS 3193, 2004; Camtepe, S. A., et al., "Combinatorial Design of Key Distribution Mechanisms for Wireless Sensor Networks", ACM/IEEE Transactions on Networks, 2007; Camtepe, S. A., et al., "Expander Graph Based Key Distribution Mechanisms in Wireless Sensor Networks", IEEE Int. Conf. on Commun., 2006); and
(iii) hybrid probabilistic and deterministic class.

In dynamic key generation solutions, a set of public and private keying materials is formed in a probabilistic, deterministic or hybrid manner and is pre-distributed to each wireless node. Two nodes exchange their public information such as node ID in a polynomial-based solution or a public column vector in matrix-based solution. The concept of combining key management and physical layer characteristics is first presented in Hershey, J. E., et al., "Unconventional Cryptographic Keying Variable Management", IEEE Transaction on Communications, January 1995 vol. 43, no. 1, pp. 3-6. Some conventional systems use steerable parasitic array radiator antennae requiring ubiquitous and cheap omni-directional antennae. Further, this method relies on strict reciprocity, without allowing for more distortion than noise and differences in transmission powers. In a real network, the most pernicious presence causing distortion is interference, not noise, which is often on the order of magnitude lower than interference. However, this method breaks down reciprocity and focuses on the entire signal envelope. Other conventional approaches use communications between a user terminal and an access point and require steerable parasitic array radiator antennae. In addition to the special antenna, this technique requires overhead bandwidth expenditure in that an access point must transmit a constant amplitude wave, which serves no purpose other than generating the key. Once again, strict reciprocity is required for the uplink and downlink signal profiles to match. In a practical setting with interference present, that simply will not be available. Another conventional method is based on the time-varying frequency characteristics, and is suitable for orthogonal frequency division multiplexing ("OFDM") systems. This method utilizes channel reciprocity and time-variant frequency characteristics to generate a security key. It also measures time difference compensation of the channel and uses a synchronous addition process for noise reduction to prevent errors in key generation. This approach is expensive and sensitive to estimation errors. Conventional systems, described above, add message exchanges, special antennas, strict reciprocity assumptions, and limit themselves to ultra-wideband ("UWB") communications.

SUMMARY ON THE INVENTION

In some embodiments, the present invention is directed to wireless communication systems.

In some embodiments, the present invention relates to wireless communications systems and methods and can be configured to take advantage of cryptographic tools that relate to randomness extractors and fuzzy extractors. Exemplary randomness extractors are disclosed in Santha, M., et al., "Generating Quasi-Random Sequences from Semi-Random Sources", Journal of Computer and System Sciences, 33:75-87, 1986, and Stinson, D., "Universal Hash Families and the Leftover Hash Lemma, and Applications to Cryptography and Computing", J. Combin. Math. Combin. Comput., vol. 42, pp. 3-31, 2002. Exemplary fuzzy extractors are disclosed in Dodis, Y., et al., "Fuzzy Extractors: How to Generate Strong Keys from Biometrics and Other Noisy Data", Advances in Cryptology, EUROCRYPT, 2004. The present invention further employs a key agreement that targets the setting where the two parties/nodes that wish to exchange a key have access to two correlated random sources (the deep fade information derived from the channel envelope), while the adversary has only partial access to this source. The systems and methods of the present invention are further configured to perform error-correction as well as flatten key distribution taking into account the specifics of channel characteristics. In some embodiments, the present invention can be further configured to use secure fuzzy information reconciliators having metrics for fuzzy extraction that are similar to error vectors that are encountered in the setting of shift-error correction systems.

The present invention provides a novel approach that couples physical layer characteristics of wireless networks with key generation algorithms. In some embodiments, the present invention can be based on an aspect of wireless communications known as a principle of reciprocity. The principle states that in the absence of interference both transmitter and receiver in a wireless communications system are configured to experience the same signal envelope (which contains all of the information in a signal). The fundamental observation here is that the signal envelope information can provide to the two transceivers two correlated random sources that provide sufficient amounts of entropy which can be used to extract a cryptographic key. In contrast, it is very difficult for a third party, which is not located at one of the transceiver's positions, to obtain or predict the exact envelope, and thus, retrieve the key.

In some embodiments, the present invention can be configured to be based on detecting deep fades to extract correlated bitstrings, as strict reciprocity property can not be maintained in the presence of interference. In some embodiments, the present invention can be directed to a wireless communication system having a pair of transceivers that can reconcile such bitstrings and finally flatten their distribution to reach a key agreement. In some embodiments, the present invention uses cryptographic tools related to randomness extraction and information reconciliation.

In some embodiments, the present invention relates to systems and methods for wireless communication that can be configured to use a "secure fuzzy information reconciliators" tool that enables description of robust key generation systems.

In some embodiments, the present invention relates to a method for providing a secure wireless ad-hoc network in a wireless communication system having at least two transceivers coupled by a wireless transmission link. The method includes the steps of: receiving a data transmission at a first transceiver from a second transceiver, wherein data transmission identifies a source of a signal in the data transmission and the signal is identified by a signal envelope; detecting a deep fade in the data transmission, wherein the first and second transceivers are configured to sample the source of the signal in the data transmission; based on the sampling, determining whether the received signal exceeds a predetermined threshold for deep fades, wherein the predetermined threshold is preset by the first and second transceivers; using the threshold for deep fades, generating a bit-string corresponding to each of the transceivers based on a channel fading information relating to the wireless transmission link; using the bit-string, generating a key.

In some embodiments, the present invention relates to a method for providing private and secure communications in wireless communication networks by generating a cryptographic key between as pair of nodes communicating on a wireless link in a wireless ad-hoc network. The method includes periodically detecting deep fades in the data transmission between transceivers, wherein said detecting includes each node sampling the signal it receives, wherein the signal is characterized by a signal envelope; and determining whether the signal exceeds an agreed-upon threshold for deep fades; generating a bit stream from the detected deep fades based on a predetermined threshold preset by both nodes of the wireless link; comparing the envelope of the received signal over a time slot with the predetermined threshold; and, generating a secret key.

In some embodiments, the present invention relates to a system for providing a secure wireless ad-hoc network in a wireless communication system. The system includes at least two transceivers coupled by a wireless transmission link, the transceivers are configured to: receive a data transmission at a first transceiver from a second transceiver, wherein data transmission identifies a source of a signal in the data transmission and the signal is identified by a signal envelope; detect a deep fade in the data transmission, wherein the first and second transceivers are configured to sample the source of the signal in the data transmission; based on the sampling, determine whether the received signal exceeds a predetermined threshold for deep fades, wherein the predetermined threshold is preset by the first and second transceivers; using the threshold for deep fades, generate a bit-string corresponding to each of the transceivers based on a channel fading information relating to the wireless transmission link; using the bit-string, generate a key.

In some embodiments, the present invention relates to an apparatus for providing private and secure communications in wireless communication networks. The apparatus includes a transmitter for sending key verification information to the receiver, a processor for sampling of a bit-string, calculation of a secret key, and a receiver capable of scanning through all possible error vectors.

In some embodiments, the present invention relates to an apparatus for providing private and secure communications in wireless communications networks. The apparatus includes a transmitter configured to apply a function Gen to a random variable bit-string, wherein the function Gen is configured to flatten a distribution of the signal and further configured to enable a reconciliation; obtain a pair of strings; set a key; and, transmit the key. The apparatus includes a receiver configured to employ a function Rep, wherein the function Rep is configured to reconstruct the key given a reconciliation information; read a received signal envelope; and recover the key.

Further features and advantages of the invention, as well as structures and operation of various embodiments of the invention, are further elaborated in detail below with references to the accompanying drawings.

BRIEF DESCRIPTION OF THE DRAWINGS

The present invention is described with reference to the accompanying drawings. In the drawings, like reference numbers indicate identical or functionally similar elements. Additionally, in most circumstances the left-most digit(s) of a reference number identifies the figure number drawing in which the reference number first appears.

FIGS. 1a-c illustrate exemplary plot of signal strength distribution in an exemplary wireless communication system having two transceivers, according to some embodiments of the present invention.

DETAILED DESCRIPTION OF THE INVENTION

I. Introduction

Figure 2:
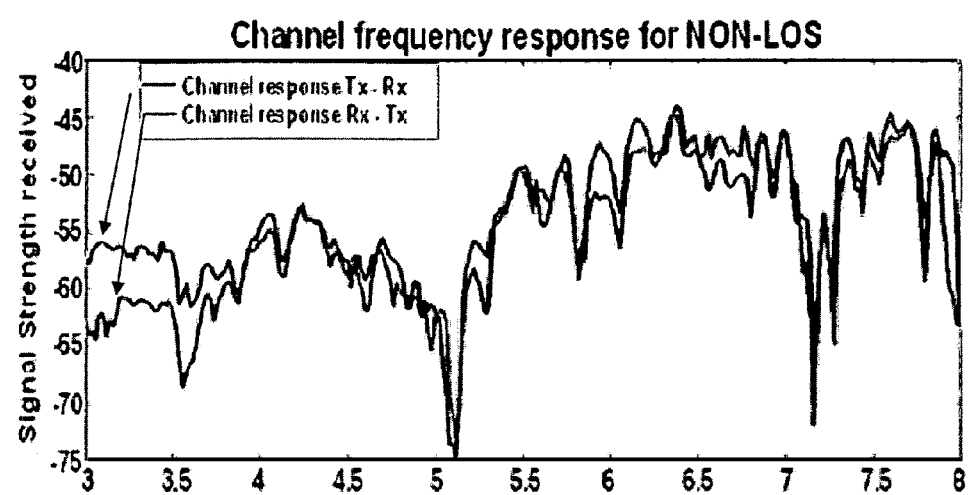
FIG. 2 illustrates an exemplary plot of channel frequency response in an exemplary wireless communication system, according to some embodiments of the present invention.

Secure communications in wireless ad-hoc networks require efficient key generation and update (or renewal) algorithms for ensuring the following: (1) message confidentiality, (2) message integrity, and (3) node authentication. However, several characteristics of wireless ad-hoc networks make conventional commonly used solutions for efficient key generation and update algorithms in wired networks inapplicable because of the following. First, wireless communication medium is a broadcast environment that permits anyone having a tuned receiver set within a radius with an adequate signal-to-interference and noise-ratio ("SINR") to eavesdrop. Second, network nodes often operate with a limited battery and computation power as well as memory. Third, wireless nodes may be mobile and stated information about their neighborhood may change—possibly often. Fourth, nodes may be incapable of accessing public key infrastructure ("PKI") to secure their communications. Thus, it is desirable to design key generation and renewal algorithms for wireless ad-hoc networks that will minimize message exchange. Currently, conventional systems do not include algorithms for generating and renewal of keys without exchanging messages and investing a great deal of computational cost. Existing key-generation algorithms, such as Diffie-Hellman algorithms (disclosed in Diffle, W. et al., "New Directions in Cryptography", IEEE Transactions and Information Theory, 22 (1976), pp. 644-654), are costly in terms of computation and communications and are designed independently from physical characteristics of networks where such algorithms are executed.

In contrast to the conventional systems, in some embodiments, the present invention is directed to wireless communications systems where physical channel characteristics are coupled with key generation algorithms to secure wireless ad-hoc networks. The present invention's technique is robust with respect to ambient interference and to errors in channel estimation. As stated above, the present invention is configured to use the reciprocity principle of wireless communications, which states that two transmitters working with substantially the same carrier frequency, in substantial absence of interference experience substantially the same signal strength from each other at the same time.

As can be understood by one skilled in the art, the presence of interference cannot be neglected in a wireless network and the reciprocity principle does not strictly apply in all situations. However, the present invention does not require identical signal envelopes for both transceivers or parties and operates based on matching deep fades, which are impervious to reasonable levels of interference, i.e., SINR. Reasonable levels of SINR mean SINR levels that allow the communication link to have an acceptable bit error rate ("BER"). Further, an acceptable SINR depends on the specific modulation technique. For example, if the target symbol error rate ("SER") is $10^{-5}$, then for PSK modulation, the SINR is approximately 24 dB for a typical Rayleigh channel (i.e., the received signal power is 24 dB stronger than the combined receiver noise and perceived ambient interference). This means that the deep fades that can be measured go as far as −24 dB deep (that is, when the receiver predominantly perceives noise plus interference, the desired signal having dropped below those two). The SINR for the QAM 64 modulation technique (that provides higher rates at the expense of greater sensitivity to noise) is approximately 33 dB for the same SER. Thus, detecting a deep fade, even in the presence of noise and interference, is possible.

In a typical environment, reflective surfaces vary from one instance to the other (i.e., received signals are time-variant): for example, a truck may be passing by a window, a reflective surface may tilt removing or adding multi-path, or the network node itself may be in a moving vehicle. Hence, the fading characteristics are, in practice, very difficult to predict, and are usually modeled as a stochastic process. However, whatever realization of that process occurs for a network receiver, the signal it sends back to its counterpart will experience the same realization of that fading at that instant. Also, the phase differences of the arriving multi-paths are quite sensitive to the position. For example, for a carrier of 850 MHz, the wavelength is about a foot long, thus, constructive interference (signal high) may change to destructive interference (deep fade) by shifting a mere half a foot. Thus, a transceiver acting as an eavesdropper, in any other position will experience different fading characteristics.

FIGS. 1a-c illustrate a reciprocity measurement using two Ultra Wide Band ("UWB") transceivers. As shown in FIGS. 1a-c, two transmitters experience substantially the same signal strength and the received signals at the receivers are configured to be highly correlated. Also, as shown in FIGS. 1a-c, the eavesdropper's received signal has very little correlation with the received signal in the legitimate receivers. By passing the UWB signal through a filter with the bandwidth of the channel, two signals are received at both legitimate receivers. These two signals are configured to have a deep fade at the same time instance.

FIG. 1a illustrates an exemplary signal received by a first radio and a second radio in time. As shown in FIG. 1a, the vertical axis is proportional to voltage on an antenna and the horizontal axis is in time units of 36 ps. FIG. 1b illustrates an exemplary signal from the first radio versus the second radio signal. In some embodiments, small deviations from a line through (0,0), as shown in FIG. 1b, with a unit slope can be caused by: 1) an operator moving during data acquisition; and 2) various small differences between the radios. In some embodiments, the signals can be highly correlated and having a correlation coefficient of 0.94. FIG. 1c illustrates exemplary radios shown in FIG. 1b, but with one of the radios moved to another location (e.g., 20 feet away). As illustrated, the multipath has changed dramatically, and only random correlations are left (e.g., where the correlation ratio is approximately equal to 0.1). Thus, eavesdropping will be virtually impossible for an adversary, unless the adversary comes very close to the sender or receiver, but in that case it will be detectable.

The same phenomenon happens when the measurements are done in frequency domain (where the frequency domain measurement is the dual of time domain measurement), as shown in FIG. 2. As illustrated in FIG. 2, the measurements can be done at both legitimate receivers. As can be seen from the measured frequency response, deep fades occur at the same frequency. The reason that some of the deep fades do not match in FIG. 2 is because the measurements are not done at exactly the same time (transceivers cannot transmit and receive simultaneously, but must allow for a small delay). Thus, the changes in the environment appear in the measurement.

In some embodiments, FIGS. 1a-2 illustrate that fading graphs can be used to generate cryptographic keys, and the non-stationary characteristics of a wireless network can be used to extract enough entropy to obtain cryptographically secure keys. As long as the channel does not become permanently stationary, the keys can be renewed frequently to cope with playback attacks. Further, once the first key is obtained, such properties can be used to ensure authenticity, and prevent middle man approach as well as and replay attacks.

To facilitate robust cryptographic key-generations, the present invention solves the following technical challenges: (i) information reconciliation between the correlated random sources that are available to the two transceivers, and (ii) flattening of the key distribution for the purpose of extracting a high quality key. In some embodiments, the present invention provides two methods for key generation based on:
 (1) error correction and key-verification-information; and
 (2) new primitive of fuzzy information reconciliators.

In some embodiments, the present invention includes a system that can be configured to include at least one threshold detector, which is already present in at least one of the transceivers. The system's nodes can use conventional omni-directional antennae, without requiring smart antennae or arrays.

II. Sampling the Random Source

According to some embodiments of the present invention, secret keys are generated periodically by detecting deep fades in the data transmission between both transceivers. Each transceiver samples its random source signal that it receives and checks to see if each sample exceeds an agreed-upon threshold for deep fades. Although signal envelopes of fading channels may change due to interference, the probability of detecting a false positive or missing a deep fade is low for practical systems with reasonable average SINR levels. Thus, deep fades information can be used in the received signal envelopes in Time Division Duplex ("TDD") systems, which distinguish uplink and downlink messages by using different time slots to extract some correlated random variables at the two transceivers.

A. Fading Channels and Reciprocity

The following provides a brief overview of reciprocity and channel fading concepts as used in the present invention. Fading can be caused by multi-path propagation and its variation can be caused by the mobility of one or both transmitting/receiving nodes (or their environment). The randomness in the signal's envelope is caused by a path loss (due to the distance between the nodes), knife-edge diffraction (e.g., caused by the corner of a building), shadowing loss (e.g., caused by obstructions), and a fading loss (e.g., due to the multi-path propagation described above). Usually some (or many) of these causes are time-varying; more so when the network nodes themselves are mobile. The moving speed of the nodes causes a shift in a Doppler frequency and the signal power spectrum spreads over the frequency domain. With a moving speed of V and a signal wavelength λ, the Doppler frequency is $$f_d = \frac{V}{\lambda}$$

The Doppler shift results in what is called a time-selective channel. This time-selective property is approximated by the coherence time, represented by, $T_c$ $$T_c = \frac{9}{16\pi f_d}$$

The coherence time is the time duration over which a received signal's amplitude and phase are predictable. The channel impulse response is invariant during the coherence time. If the symbol time of the received signal is smaller than coherence time, then the channel is called time-invariant. The coherence time is used to define the channel fading characteristics in the time domain.

B. Thresholding

The following presents an overview of a thresholding concept in the wireless communication system, according to the present invention. In some embodiments, the two transceivers will use the channel fading information to extract a bit stream (that will later be used for generating a key). The bit stream is generated based on a threshold that is set by both sides/transceivers/nodes of a wireless link. Statistics of the generated bit stream and, consequently, the generated key, depends on this threshold as well as the transmit power and the attenuation in the link. To determine this threshold, an automatic gain control (AGC) mechanism can be used so that the statistics of the generated key is independent of the transmit power and the link attenuation. An occurrence of a fade and its duration is a random process. Once the threshold is set, the average fade duration and level crossing rates depend on the channel statistics. For a Rayleigh fading channel, it can be shown that the mean fade duration and the level crossing rates are given as follows:

$$\bar{\tau}(R) = \frac{e^{\rho^2} - 1}{\rho f_m \sqrt{2\pi}}$$

where $$\rho = \frac{R}{R_{rms}}$$

and $f_m$ are the maximum Doppler frequency, R is the threshold, $R_{rms}$ is a real-mean-square ("RMS") value of the received signal.

The rate of occurrence of fades (signal crossing threshold R) is given by $$N(R) = \sqrt{2\pi} f_m \rho e^{-\rho^2}$$

Figure 6:
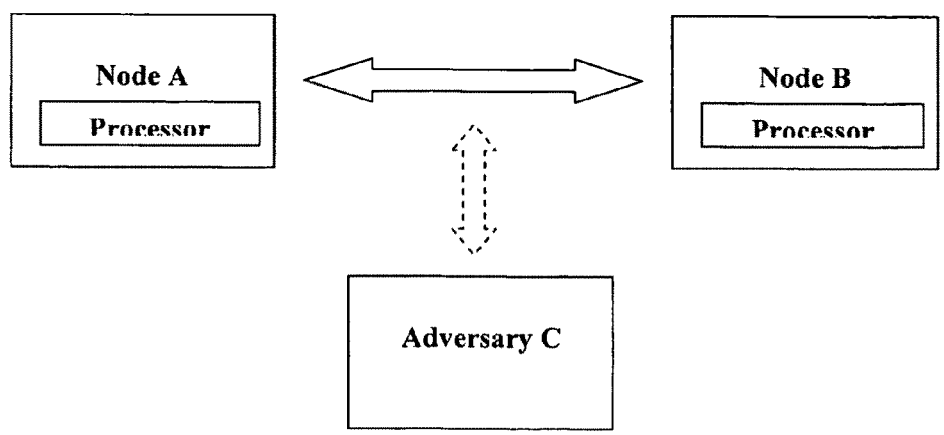
FIG. 6 illustrates an exemplary wireless communication system, according to some embodiments of the present invention.

FIG. 6 illustrates a situation where node A transmits its signal to node B while receiver C (an adversary) is listening to the same broadcast. If C is more than a wavelength away from B, then occurrences of deep fades at B and C are independent.

Thus, the adversary cannot guess the exact moment of deep fade occurrences or their duration.

C. Deep Fades to Bit Vectors

The following outlines a brief description of bit vectors, as used in the wireless communication systems and methods, according to the present invention. The next step after selecting a fade-crossing threshold for a signal envelope is to compare the received signal envelope over each time slot with the selected threshold.

If the envelope of the received signal is below the threshold, which means a deep fade occurred, a bit is set to 1 for this time slot. If the envelope of received signal is above the threshold, which means no deep fade happened over this time slot, a bit is to 0 for this time slot. After a period of time, a bit stream from each downlink and uplink channel is obtained to construct bit-vectors ("BV"). In some embodiments, bit-vectors from the downlink and from the unlink channels can be quite similar because they receive signals with similar characteristics due to channel reciprocity. Although the downlink node and uplink node access the channel in different time slots, channel reciprocity results in similar channel response for both as long as the duration of each time slot is much smaller than the channel coherence time. In some embodiments, the present invention system includes a key generation circuit that passes the received signal through a very narrow-band filter for a narrow-band system, or through a bank of several very-narrow-band filters if the channel is frequency selective. In the former case, many narrow-band interferers are likely to be filtered out entirely. This is a very economical way for both cases to reduce the effect of interference (or even an adversary's jamming signal).

D. Random Source Characteristics

The following presents a brief overview of exemplary random source characteristics, as used in the systems and methods of the present invention. Given the above, it follows that the two transceivers can be configured to retrieve two bit-strings that will have a number of "runs" (i.e., sequences of 1s) that correspond to deep fades as they are experienced in their signal envelopes.

In some embodiments, the bit-strings can be correlated based on the reciprocity principle, described above, however they can also have a number of discrepancies. For example, in some instances, a discrepancy can be presented at the beginning or the end of each deep fade if the deep fade lasts over several time slots. Another reason for a bit discrepancy is that the stream in the downlink may be a slightly shifted version of the one in the uplink. In other instances, a discrepancy can be caused by having one transceiver believing that a certain deep fade occurred over some time slots, while the other transceiver having no such information (such discrepancy can be due to "chattering" and/or other local noise conditions). In some embodiments, the present invention can be configured to deal with such discrepancies by applying error-correction (or information reconciliation techniques) to correct shift type of errors or filtering to deal with chattering. Both alternatives are discussed below. For the purposes of description, it is assumed that the adversary has information on the number of deep fades that have occurred in a certain time-frame but that the adversary is not privy to the locations of such fades.

III. Key Generation

Figure 7:
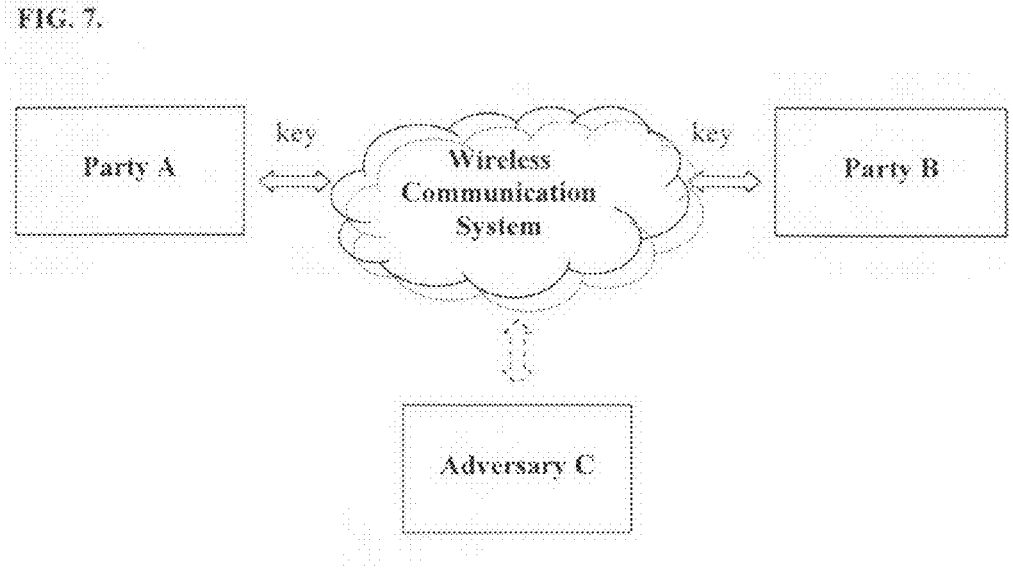
FIG. 7 illustrate another exemplary wireless communication system, according to some embodiments of the present invention.

The following discussion provides an exemplary system and method for generating a key in a wireless communication system, according to the present invention. FIG. 7 illustrates parties A and B that desire to generate a key for providing a secure communication in a wireless communication system. Parties A and B have access to two correlated random sources $R_A$ and $R_B$ over $\{0, 1\}^n$. As further illustrated in FIG. 7, an adversary may be eavesdropping or even interfering with the random sources $R_A$ and $R_B$. Whenever A and B sample their random sources, $R_A$ and $R_B$, they obtain two bit-strings $\rho_A$ and $\rho_B$ respectively. Moreover, the adversary obtains a bit-string $\rho_C$. The triple of random variables $(\rho_A, \rho_B, \rho_C)$ is distributed according to Env, wherein Env is a joint distribution that is based on the properties of the channel as well as assumptions about the environment that affect the wireless transmission. In some embodiments, the adversary has no information whatsoever about $\rho_A$, $\rho_B$. This translates to the setting where the variable $\rho_C$ is independent of the variables $\rho_A$, $\rho_B$. In some embodiments, randomness extractors and the leftover hash lemma are used, as represented by the following definition of a randomness extractor:

Randomness Extractor: a function Ext is called a (n, m, $l_0$, $\epsilon$)-extractor if Ext is a mapping $\{0,1\}^n \times R \to \{0,1\}^{l_0}$ such that if $\rho$ is any random variable satisfying $H_\infty(\rho) \geq m$ it holds that $\|\langle\text{Ext}(\rho, \tau), \tau\rangle - \langle\rho_u, \tau\rangle\| \leq \epsilon$, where $\rho_u$ is uniformly distributed over $\{0,1\}^{l_0}$ and $\tau$ is uniformly distributed over R. Alternatively, if $\rho$ is a specific random variable and the function Ext satisfies the above property, Ext is a <n, $l_0$, $\epsilon$>-extractor for $\rho$.

In some embodiments, a key exchange system in the present invention's wireless communication system can be defined as follows. In some embodiments, key exchange system protocols can be configured to involve two parties A, B, where A is an initiator and B is a responder (as can be understood by one skilled in the art, these designations are for illustrative purposes only). In some embodiments, the key exchange system can be configured to be characterized by the correctness and uniformity properties. As can be understood by one skilled in the art, other properties can also characterize the system. In some embodiments, the uniformity property can be also configured to capture a security property. The key-exchange protocols are configured to permit a two-party protocol $\pi$ to take advantage of an oracle $O^{Env}$ that can be parameterized by a probability distribution Env and can be further configured to operate in the following manner.

In some embodiments, using a parameter of Probability Distribution Env, the following can occur:

Upon receiving a request from player A, if $<\rho_A, \rho_B, \rho_C>$ have not been determined yet, sample such triple from Env and return $\rho_A$.

Upon receiving a request from player B, if $<\rho_A, \rho_B, \rho_C>$ have not been determined yet, sample such triple from Env and return $\rho_B$.

Upon receiving a request from the adversary, if $<\rho_A, \rho_B, \rho_C>$ have not been determined yet, sample such triple from Env and return $\rho_C$.

Formally, a (l, c, $\epsilon_s$)-key-generation protocol is a two party protocol n between parties A, B utilizing an oracle $O^{Env}$ such that the following properties hold true:

1) Correctness. The event of having an equal output of the two parties A, B after execution of the protocol $\pi$ has probability at least $1-\epsilon_c$, where such probability is taken over all coin tosses of $\pi$.

2) Uniformity. The random variable that corresponds to the output of the two parties can be configured to be conditioned on:

(i) an event that the output of the two parties is equal,
(ii) the transcript of the protocol $\pi$ that generates it, and
(iii) the adversary's output from $O^{Env}$ that has statistical distance from the uniform distribution over $\{0, 1\}^l$ at most $\epsilon_s$.

A. Key Generation Based on Key Verification Information

The following is a description of an exemplary method for designing a key-generation system, according to some embodiments of the present invention. As stated above, the differences between the random sources, $R_A$ and $R_B$, that are observed between the two legitimate players will predominantly happen at the beginning and/or at the end of some deep fades, and that such fades occur randomly over a period of time. Based on the present invention's method, it is possible for one of the players to correct these differences based on a key-verification information that is released by the other player. For the sake of description only, assume that player A is the sender and player B is the receiver. Further, suppose that $(\rho_A, \rho_B, \rho_C)$ is distributed according to Env; now, assume that $\rho_A$ is the "correct" bit-string (as can be understood by one skilled in the art, in real world situation, neither player will have a bit vector reflecting the true physical channel realization, i.e., the sender has the correct bit-string, and the receiver has to correct its own bit-string $\rho_B$ to match $\rho_A$.

Given any bit-string, a "run" is a sequence of consecutive of 1s within the bit-string. Based on the mapping of deep fades into sequences of 1s, it is clear that $\rho_A$ contains a run for each deep fade that occurred in the envelope of the wireless transmission. Suppose that the length of each $\rho_A$ and $\rho_B$ bit-strings is n, the number of deep fades is t, and each fade extends for a number of $k_\tau$ time slots ($\tau=1, \ldots, t$), i.e., each fade results in a $k_\tau$-bit long run within the strings $\rho_A$ and $\rho_B$. To simplify this analysis, assume that in n time-intervals there exist t deep fades, wherein each one of them having a length k. As can be understood by one skilled in the art, in reality the parameter k can vary for each fade.

Given the assumption that deep fades are uniformly distributed within a time interval (and assuming that t and k are fixed constants, and $n \geq 2kt$), the entropy $E_{n,t,k}$ of the string $\rho_A$ will be:

$$E_{n,t,k} = \Omega\left(t\log\frac{nk}{2t} + n\log\frac{n}{n-2t}\right)$$

Figure 3:
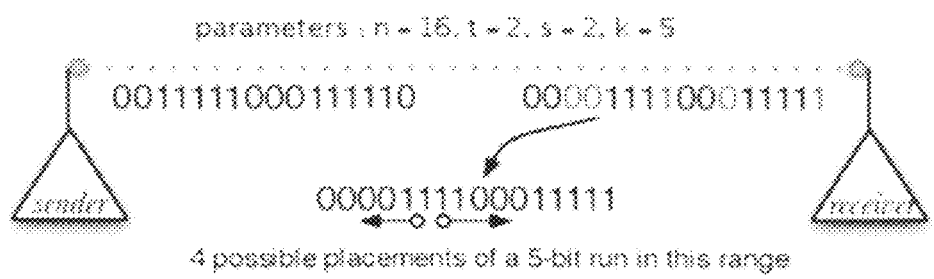
FIG. 3 illustrates an exemplary representation of a direct key generation through a search of all possible keys in an exemplary wireless communication system, according to some embodiments of the present invention.

In order to achieve an agreement between the two parties, it is advantageous that the run of $\rho_A$ and $\rho_B$ may be different only in the beginning and ending bits of a deep fade. Suppose that s is a parameter that specifies the maximum number of bits that can be different on either side of a run between $\rho_A$ and $\rho_B$. Assume that the sender has t runs of length k. Now, suppose that for some parameter s, it holds that k>2s, and when $\rho_B$ is sampled, each run may be extended to the left or right by a number between zero and s bits. This suggests that if a run is observed in the interval [f, g] by the sender, there exist r, l ∈ {−s, . . . , s} such that the receiver observes the same run at locations [f+l, g+r] and the length of this run is also k, i.e., r−l=k+f−g−l. The total number of pairs (r, l) that satisfy the constraint is 2s+1. Thus, for each run, the receiver has a number of 2s+1 possibilities. Given that there are t runs, the total space of errors, numbers at most $(2s+1)^t$ vectors, as shown in FIG. 3.

For reasonably small values of t, this means that it is possible for the receiver to scan through all possibilities and recover the exact bit-string that was obtained by the sender. It should be noted that keeping t small will not necessarily make the entropy of the channel too low as reliance can be placed on the value of n/k to maintain it at a safely high level for the purposes of generating a cryptographic key. A similar analysis can be performed in a situation when there is small variation in k from one run to the other. Thus, it follows that the receiver will require some "key verification information" so that it is assisted in finding the correct match. Given the above, in some embodiments, the key-generation algorithm method operates as follows:

(1) the sender and receiver sample $\rho_A$ and $\rho_B$, respectively;

(2) the sender then, calculates the key and sends a key verification information ("KVI") to the receiver; and, (3) based on KVI, the receiver decides on the correct key by scanning through all possible error-vectors.

The key verification information submitted to the receiver can be obtained by computing a value of the form <μ, k, $U_k$(key)> where μ, k are selected at random from a fixed bit-string size and U is a keyed hash function, discussed below. Finally, the key is computed as key=H(μ, $\rho_A$), where H is a hash function, discussed below. The receiver, using $\rho_B$, tries all $(2s+1)^t$ modifications and attempts to match the $U_k$ value using $h_i$=H(μ, $\rho'_B$) as the key where i=1, . . . , $(2s+1)^t$ and $\rho^i_B$ is the $i^{th}$ possible version of $\rho_B$. If there is a match, the search stops and the receiver sets its key as $h_i$. Suppose now that the adversary, through knowledge of the statistics of the channel, deduces the average number of deep fades t as well as their average length, k—the adversary cannot know their locations.

Assuming the following three conditions:

1. Suppose key≠key' $\in \{0,1\}^{l_o}$, then it holds $$\text{Prob}[U_k(\text{key})=U_k(\text{key}')] \leq \epsilon_2,$$

where k is distributed uniformly over $\{0, 1\}^k$. In other words, $\{U_k\}_k$ is a universal hash family.

2. H: R×$\{0, 1\}^n \to \{0,1\}^{l_o}$ satisfies that the random variable (μ, H(μ, w)) has $\epsilon_1$ statistical distance from (μ, u) that is uniformly distributed over R×$\{0,1\}^{l_o}$ and w distributed according to $R_A$ conditioned on $R_C$. In other words, H is an <n, $l_0$, $\epsilon_2$>-extractor for the source $R_A$ conditioned on $R_C$.

3. The probabilistic map F(w)=(k, $U_k$(w)) with k uniformly distributed, hides all functions of its input, i.e., for every PPT A there is a PPT A' such that for any f, $$|\text{Prob}[A(F(w))=f(w)] - \text{Prob}[A'(1^n)=f(w)]| \leq \epsilon_3$$

where w is uniformly distributed over $\{0, 1\}^n$. Given the above three conditions, it holds that KG, as described above, is a (n, $l_0$, $\epsilon_1$, $\epsilon_2$, $\epsilon_3$, $\epsilon_2+\epsilon_3$)-key-generation system.

The above calculation suggests that a key generation system of the present invention can be constructed as long as the functions H and U satisfy the following properties. First, U is a universal hash function family. Second, H is an extractor for the source $R_A$, i.e., given the random variable $\rho_A$ that is distributed according to the triple <$\rho_A, \rho_B, \rho_C$> from Env, it holds that H (μ, $\rho_A$) is $\epsilon_2$ away from the uniform distribution of $\{0,1\}^{l_0}$. This condition happens conditioned on $R_C$ as prescribed in the distribution of Env. This function can be implemented using a general purpose extractor that can be constructed based on universal hash functions. The standard construction also applies in the case of a conditional entropy. In this case, it holds that $l_0=E_{n,k,t}+2-2\log \epsilon_2^{-1}$ where $E_{n,k,t}$ is the entropy function defined above.

With regard to the security, the function W can be configured to (in addition to being configured as a universal hash) also hide all functions of its input. In some embodiments, it is also possible to "throw away" bits of a key that are fixed by $U_k$(key) and use the remaining bits. This embodiment will improve security of the system of the present invention but it may reduce the efficiency of the scheme, as more bits will be extracted.

In an exemplary embodiment where k=5, t=12, n=512, it holds that the conditional entropy of $\rho_A$ given $\rho_C$ is at least 77 bits. Using a universal hash family for H, a 55-bit key can be obtained that is $2^{-12}$ away from the uniform distribution over $\{0, 1\}^{55}$. In order for the receiver to recover this key for s=2, it will have to execute a brute-force step of $2^{24}$ operations, where each operation involves one application of the universal hash family H(v, •) and one application of the universal-one-way hash $U_k(•)$. If H is substituted with a universal hash of comparable time complexity to that of MD5 and U is substituted with a universal one-way hash family comparable to an HMAC, the key can be recovered in at most 42 seconds in a standard laptops.

B. Key Generation Using Secure Fuzzy Information Reconciliators

In some embodiments, the present invention is directed to an exemplary wireless communication system and method where a key is generated using secure fuzzy information reconciliators ("SFIR"). The following description assumes that the length of each deep fade, as described above, is not identical to the other. In some embodiments, SFIR can be configured to present a key generation system that enables fast error-correction that is unconditionally secure and is independent of lengths of deep fades. In some embodiments, a fuzzy extractor can be similar to a randomness extractor. The fuzzy extractor can be configured to include a built-in error-correcting capability such that any value of an imperfect random source that belongs to a sphere of a certain fixed radius for a given metric can be repaired to the same identical randomness extraction.

Assuming that Env=$<\rho_A, \rho_B, \rho_C>$ is joint random variable over $\{0, 1\}^{3n}$. A $(n, l_0, \epsilon_1, \epsilon_2)$-SFIR for Env is a pair of (Gen, Rep) that satisfies the following:

(1) if $<f,p> \leftarrow \text{Gen}(\rho_A)$, then $\text{Prob}[\text{Rep}(\rho_B,p)=f] \geq 1-\epsilon_1$; and (2) on its first output, Gen is a $(n, l_0, \epsilon_2)$-extractor for the random variable $\rho_A$ conditioned on $\rho_C$ as well as the second output of Gen.

In some embodiments, SFIR scheme can be configured to design a key agreement system that enables the sender and the receiver to recover the same key, key=f, even if they have slight discrepancies in their bit-vectors due to interference. In some embodiments, the present invention's SFIR scheme is configured to correct a class of errors that corresponds to shifts present in the runs within one of the two bit-strings (relative to the other). Further, the reconciliation information p can be configured to leave enough entropy in $\rho_A$ to apply randomness extraction. Also, according to the present invention, a random variable that is produced by the envelope can be defined as follows: given a random pattern p, one of the two parties (e.g., the sender) records values $\{l_1, \ldots, l_t\} \subset \{1, \ldots, n\}$, which correspond to locations of deep fades within the n time slots, where $l_i \in \{0, 1\}^u$ with $u=\lceil \log n \rceil$.

In some embodiments, the present invention's exemplary SFIR (Gen, Rep) technique can be configured to use an error-correction parameter s described above and can be further configured to operate as follows. In some embodiments, a function Gen is applied to a random variable bit-string, wherein the function Gen is configured to flatten a distribution of an input and further configured to enable a reconciliation. In some embodiments, a function Rep is applied to read a bit string corresponding to the random source of a transceiver, wherein the function Rep is configured to reconstruct the key given a reconciliation information. According to the methods of the present invention, function Gen, given $\rho_A$, computes values loc=$\{l_1, \ldots, l_t\}$ and then calculates the "tuple" $\langle \tilde{l}_1, \ldots, \tilde{l}_t \rangle$ where $\tilde{l}_j = l_j \mod(2s+1)$. Then, the function Gen selects µ to seed an extractor H and produces the output (f, p)=(H(µ,$\tilde{\rho}_A$), (µ, $\langle \tilde{l}_1, \ldots, \tilde{l}_t \rangle$)). It should be noted that $\tilde{\rho}_A$ is based on $\rho_A$ but it is normalized so that all its runs are of length k, where k is some fixed parameter. As such, $\tilde{\rho}_A$ does not necessarily has length n.

In some embodiments, an exemplary function Rep is configured to operate according to the following method. First, function Rep receives as input $\rho_B$ as well as the value p= (µ, $\langle \tilde{l}_1, \ldots, \tilde{l}_t \rangle$). The receiver will parse $\rho_B$ for the locations of deep fades and will find their locations $\{l'_1, \ldots, l'_t\} \subset \{1, \ldots, n\}$. Then, the original locations $l_1, \ldots, l_t$, will be corrected by computing $$l_j^* = l'_j - (l'_j \mod(2s+1)) + \tilde{l}_j.$$

Subsequently, the function Rep calculates a bit-string $\rho^*$ with t runs of length k at locations $1^*_1, \ldots, 1^*_t$. The, the function Rep feeds µ, $\rho^*$ into extractor H and terminates returning $f^*=H(µ, \rho)$ As long as $|l_j, \ldots, l_j| \leq s$, then it holds that $1^*_j = l_j$ and thus $\rho^* = \tilde{\rho}_A$, hence, the key agreement is achieved. The average min-entropy $\tilde{H}(\rho_A|\rho_C, p)$ wherein p is derived from $<f, p> \leftarrow \text{Gen}(\rho_A)$ is at least $$D_{n,t,s} = \log\binom{n}{t} - t\lceil \log(2s+1) \rceil.$$

An extractor H is implemented using the above calculations and the following leftover hash lemma. Suppose that $<\rho_A, \rho_B, \rho_C>$ is distributed according to Env. Assume that with probability $1-\epsilon_1$, $\rho_A$ contains t runs and $\rho_B$ contains t runs that shifted either left or right by an amount of s time slots. Then, there is a way to implement $<\text{Gen, Rep}>$, as described above so that it is a $(n, l_0, \epsilon_1, \epsilon_2)$-SFIR with $l_0=D_{n,t,s}+2-2\log(1/\epsilon_2)$. Based on SFIR having (Gen, Rep) function, the method generating a key is performed as follows:

(1) The sender A applies Gen to the random variable $\rho_A$ to obtain a pair of strings $<f, p>$; it will set key=f.

(2) The sender A transmits to the receiver B the value p.

(3) The receiver B employs the function Rep and receiver B's reading of the envelope $\rho_B$ to recover key=f.

Based on the above method for generating key and given a $(n, l_0, \epsilon_1, \epsilon_2)$-SFIR for the envelope distribution $<\rho_A, \rho_B, \rho_C>$, the protocol KG described above is a $(n, l_0, \epsilon_1, \epsilon_2, 0)$-key-generation system for the distribution Env=$<\rho_A, \rho_B, \rho_C>$.

In some exemplary embodiments, where t=38, n=2000, s≥4, it holds that the min entropy is $D_{2000,38,4}=191$. Thus, the key has a length $l_0=81$ bits that will have distance less than $2^{-56}$ from the uniform distribution over $\{0, 1\}^{l_0}$.

Figure 4:
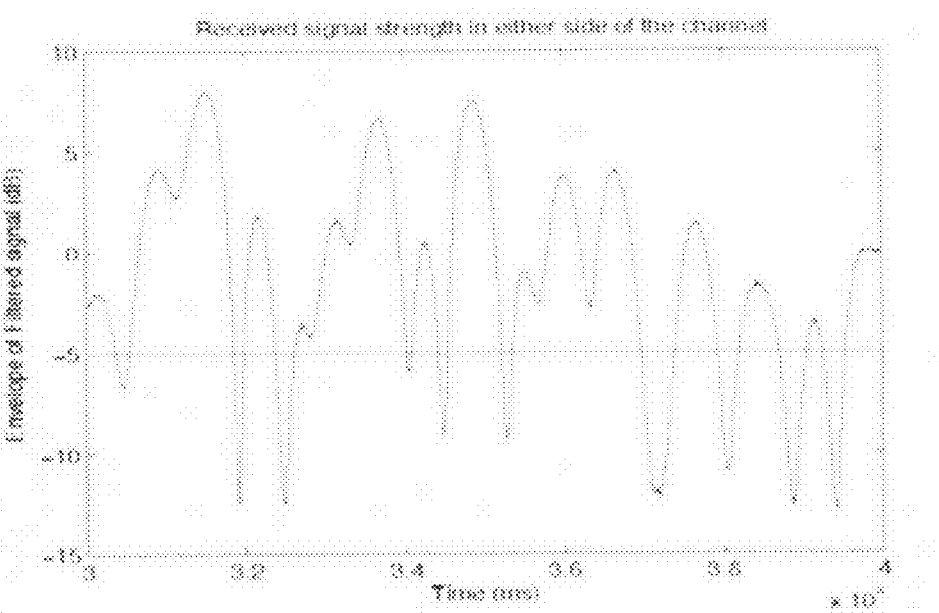
FIG. 4 illustrates an exemplary plot of a received signal strength during an interval of one second between two transceivers in an exemplary wireless communication system, according to some embodiments of the present invention.
Figure 5:
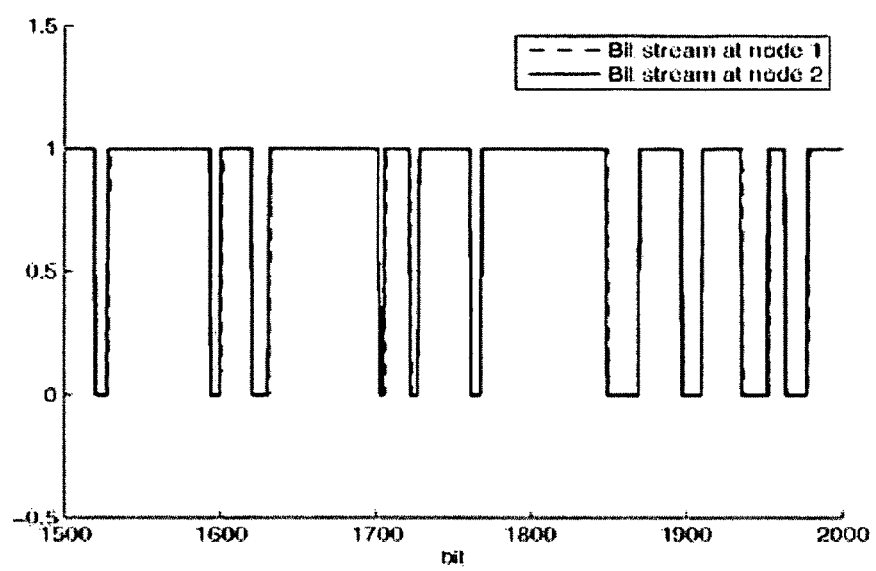
FIG. 5 illustrates an exemplary plot of a comparison of the generated bits for two transceivers in an exemplary wireless communication system, according to some embodiments of the present invention.

FIGS. 4 and 5 illustrate exemplary results of implementations of the key generation systems and methods, according to some embodiments of the present invention. FIG. 4 illustrates an exemplary received signal strength during an interval of one second at both sides of a communication channel after application of a low pass filter. In some embodiments, the low pass filter can be used to reduce the noise. FIG. 5 illustrate a comparison of generated bits at first and second nodes of a communication channel, according to some embodiments of the present invention.

FIGS. 4-5 further illustrate results of an exemplary embodiment of the present invention's communication system with a Rayleigh fading channel and further having two legitimate nodes. Each node perceives that a signal is transmitted through this channel and each node thus generates their own bit streams. In this exemplary implementation, the parameters of this channel are:

(1) BPSK communication with the bit rate of 1 Mbps.
(2) SINR of 25 dB (equivalent to a BER of $10^{-5}$ for a multi-path fading channel).
(3) Doppler shift of 1 Hz.
(4) To reduce the effect of noise in estimating the bit streams at both sides of the channel, the received signal is filtered with a narrow low pass filter with a bandwidth of 100 Hz. This narrow bandwidth filter has a benefit of reducing the noise dramatically. As stated above, FIG. 4 illustrates the received signal strength of both sides of the communication channel after the low pass filter has been applied. The narrow band filter with bandwidth of 100 Hz is enough to capture the signal fluctuation due to the change in the environment.

To generate bit streams on each side of the channel, each node samples the output of its low pass filter and compares it with a set threshold. FIG. 5 illustrates the generated bits at both nodes when the threshold is set to −5 dB. As can be seen from FIG. 5, the two generated sequences are very similar, in spite of the fact that each node experienced its own levels of interference and neither communicated with each other any decision regarding generation of these bit streams. The only occasional differences occur when there is a transition from 0 to 1 or 1 to 0—that is, at the edge of a deep fade. These mismatches between the sequences are due to many reasons, including the different timing between the two nodes (since there is a slot delay between each one's transmission) and each node's distinct interference and noise that passes through its low pass filter. As can be understood by one skilled in the art, FIG. 5 depicts the raw output of the low pass filter and threshold detector, without engaging in any aforementioned techniques to match up the two bit vectors. For the setup in this simulation, a study of 100 seconds was conducted, wherein deep fades occur with an average rate of 19 per one thousand bits. This means that for n=1000, the resulting number of fades is t=19. As can be understood by one skilled in the art, the present invention is not limited to the above simulation results.

Example embodiments of the methods and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed:

1. A method for providing a secure wireless ad-hoc network in a wireless communication system having at least two transceivers coupled by a wireless transmission link, the method comprising the steps of:
receiving a data transmission at a first transceiver from a second transceiver, wherein the data transmission identifies a source of a signal in the data transmission and the signal is identified by a signal envelope;
detecting a deep fade in the data transmission, wherein the first and second transceivers are configured to sample the source of the signal in the data transmission;
based on the sampling, determining whether the received signal exceeds a predetermined threshold for deep fades, wherein the predetermined threshold is preset by the first and second transceivers;
using the threshold for deep fades, generating a bit-string corresponding to each of the transceivers based on channel fading information relating to the wireless transmission link; and
using the bit-string, generating a key.

2. The method according to claim 1, further comprising the step of
comparing the signal envelope with the predetermined threshold over a period of time to determine whether a deep fade occurred.

3. The method according to claim 1, wherein said detection is periodic.

4. The method according to claim 1, further comprising
determining whether the envelope of the received signal is below a threshold;
determining that a deep fade has occurred; and
setting a bit within the bit-string to one.

5. The method according to claim 4, further comprising
determining whether the envelope of the received signal is above the threshold;
determining that a deep fade did not occur; and
setting a bit within the bit-string to zero.

6. The method according to claim 1, wherein the system further includes a key generation circuit having a filter coupled to the transceivers;
the method further comprising a step of:
passing the received signal through the filter to filter out interference.

7. The method according to claim 1, wherein each signal source is characterized by a bit string.

8. The method according to claim 7, further comprising generating a bit vector for each transceiver, wherein the bit vector for each transceiver is configured to be constructed from the bit stream and wherein bit vectors for uplink and downlink between transceivers are configured to be similar due to channel reciprocity.

9. The method according to claim 8, wherein a sequence of consecutive ones within the bit vector identifies a deep fade within a signal envelope.

10. The method according to claim 1, further comprising the steps of:
using the first transceiver,
calculating the key; and
releasing key verification information to the second transceiver;
using the second transceiver, determining second transceiver correct key based on key verification information received from the first transceiver.

11. The method according to claim 1, wherein deep fades are uniformly distributed over the period of time.

12. The method according to claim 1, wherein the entropy of the wireless link between the first and second transceivers in communication can be configured to be:

$$E_{n,t,k} = \Omega\left(t\log\frac{nk}{2t} + n\log\frac{n}{n-2t}\right)$$

wherein t is a number of deep fades in the signal envelope, n is a length of each bit string for each of the transceivers, k is a number of time slots over which deep fades extend within the bit strings, wherein k is configured to vary for each deep fade.

13. The method according to claim 1, further comprising a step of:
- generating the key using a secure fuzzy information reconciliator ("SFIR");
- wherein SFIR is configured to operate based on independent lengths of deep fades.

14. The method according to claim 13, further comprising the step of using SFIR, performing fast error correction independently of lengths of deep fades.

15. The method according to claim 14, further comprising the step of using SFIR, recovering the same key for both transceivers.

16. The method according to claim 15, wherein the step of generating the key further comprises
- using SFIR
  - using the first transceiver,
    - applying a function Gen to a bit string corresponding to the random source of the first transceiver signal, wherein function Gen is configured to flatten a distribution of the signal and further configured to enable a reconciliation;
    - generating a pair of strings <f,p>corresponding to the key and a reconciliation information, respectively; and
    - setting key=f;
    - transmitting the value p to the second transceiver; and
  - using the second transceiver,
    - applying function Rep to read a bit string corresponding to the random source of the second transceiver, wherein function Rep is configured to reconstruct the key given the reconciliation information p; and
    - recovering key=f.

17. A method for providing private and secure communications in wireless communication networks by generating a cryptographic key between a pair of nodes communicating on a wireless link in a wireless ad-hoc network, the method comprising the steps of:
- periodically detecting deep fades in the data transmission between transceivers, wherein said detecting includes
  - each node sampling the signal it receives, wherein the signal is characterized by a signal envelope; and
  - determining whether the signal exceeds an agreed-upon threshold for deep fades;
- generating a bit stream from the detected deep fades based on a predetermined threshold preset by both nodes of the wireless link;
- comparing the envelope of the received signal over a time slot with the predetermined threshold; and,
- generating a secret key.

18. The method according to claim 17, further comprising generating the secret key based on key verification information, wherein said generating step further comprises the steps of:
- sampling by each node of a respective bit-string;
- calculating the key by a first node;
- sending the key verification information to the second node;
- using the second node, determining a correct key based on the key verification information, wherein said determining further includes
  - scanning through all possible error vectors related to the bit-string.

19. The method according to claim 17, further comprising generating the secret key using a secure fuzzy information reconciliator ("SFIR"), wherein said generating further comprises the steps of:
- using a first node,
  - applying Gen function to a random variable bit-string to obtain a pair of strings (f, p), wherein function Gen is configured to flatten a distribution of the signal and further configured to enable a reconciliation and wherein the pair of strings <f,p>corresponding to the key and a reconciliation information, respectively; and
  - setting the key equal to f;
  - transmitting the value p in the pair of strings to the second node; and
- using a second node,
  - applying function Rep to read a signal envelope to recover the key, wherein function Rep is configured to reconstruct the key given the reconciliation information p.

20. A system for providing a secure wireless ad-hoc network in a wireless communication system, comprising
- at least two transceivers coupled by a wireless transmission link, the transceivers configured to:
- receive a data transmission at a first transceiver from a second transceiver, wherein data transmission identifies a source of a signal in the data transmission and the signal is identified by a signal envelope;
- detect a deep fade in the data transmission, wherein the first and second transceivers are configured to sample the source of the signal in the data transmission;
- based on the sampling, determine whether the received signal exceeds a predetermined threshold for deep fades, wherein the predetermined threshold is preset by the first and second transceivers;
- using the threshold for deep fades, generate a bit-string corresponding to each of the transceivers based on channel fading information relating to the wireless transmission link; and
- using the bit-string, generate a key.

21. The system according to claim 20, wherein the transceivers are further configured to compare the signal envelope with the predetermined threshold over a period of time to determine whether a deep fade occurred.

22. The system according to claim 20, wherein said detection is periodic.

23. The system according to claim 20, wherein the transceivers are further configured to:
- determine whether the envelope of the received signal is below a threshold;
- determine whether a deep fade has occurred; and
- set a bit within the bit-string to one.

24. The system according to claim 23, wherein the transceivers are further configured to:
- determine whether the envelope of the received signal is above the threshold;
- determine whether a deep fade did not occur; and
- set a bit within the bit-string to zero.

25. The system according to claim 20, wherein the system further includes a key generation circuit having a filter coupled to the transceivers;
- wherein the transceivers are further configured to:
- pass the received signal through the filter to filter out interference.

26. The system according to claim 20, wherein each signal source is characterized by a bit string.

27. The system according to claim 26, wherein the transceivers are further configured to generate a bit vector for each transceiver, wherein the bit vector for each transceiver is configured to be constructed from the bit stream and wherein bit vectors for uplink and downlink between transceivers are configured to be similar due to channel reciprocity.

28. The system according to claim 27, wherein a sequence of consecutive ones within the bit vector identifies a deep fade within a signal envelope.

29. The system according to claim 20, wherein the transceivers are further configured to:
  using the first transceiver,
    calculate the key; and
    release key verification information to the second transceiver;
  using the second transceiver,
    determine second transceiver correct key based on key verification information received from the first transceiver.

30. The system according to claim 20, wherein deep fades are uniformly distributed over the period of time.

31. The system according to claim 20, wherein the entropy of the wireless link between the first and second transceivers in communication can be configured to be:

$$E_{n,t,k} = \Omega\left(t\log\frac{nk}{2t} + n\log\frac{n}{n-2t}\right)$$

wherein t is a number of deep fades in the signal envelope, n is a length of each bit string for each of the transceivers, k is a number of time slots over which deep fades extend within the bit strings, wherein k is configured to vary for each deep fade.

32. The system according to claim 20, wherein the transceivers are further configured to:
  generate the key using a secure fuzzy information reconciliator ("SFIR");
  wherein SFIR is configured to operate based on independent lengths of deep fades.

33. The system according to claim 32, wherein the transceivers are further configured to:
  using SFIR, perform fast error correction independently of lengths of deep fades.

34. The system according to claim 33, wherein the transceivers are further configured to:
  using SFIR, recover the same key for both transceivers.

35. The system according to claim 34, wherein generation of the key further comprises:
  using SFIR
    using the first transceiver,
      apply a function Gen to a bit string corresponding to the random source of the first transceiver signal, wherein the function Gen is configured to flatten a distribution of an input signal and further configured to enable a reconciliation;
      generate a pair of strings <f, p>corresponding to the key and a reconciliation information, respectively; and
      set key=f;
      transmit the value p to the second transceiver; and
    using the second transceiver,
      apply a function Rep to read a bit string corresponding to the random source of the second transceiver, wherein the function Rep is configured to reconstruct the key given the reconciliation information p; and
      recover key=f.

\* \* \* \* \*